US010908617B2

(12) United States Patent
Kodera et al.

(10) Patent No.: US 10,908,617 B2
(45) Date of Patent: Feb. 2, 2021

(54) VEHICLE PLATOONING SYSTEM (71) Applicant: TOYOTA JIDOSHA KABUSHIKI KAISHA, Toyota (JP)

(72) Inventors: Hiroaki Kodera, Susono (JP); Takahito Endo, Shizuoka-ken (JP); Kensei Hata, Shizuoka-ken (JP); Naoki Harayama, Shizuoka-ken (JP); Katsuya Iwazaki, Susono (JP); Yushi Seki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 134 days.

(21) Appl. No.: 16/202,229

(22) Filed: Nov. 28, 2018

(65) Prior Publication Data
US 2019/0163205 A1 May 30, 2019

(30) Foreign Application Priority Data

Nov. 30, 2017 (JP) .................. 2017-230967

(51) Int. Cl.
G05D 1/02 (2020.01)
G05D 1/00 (2006.01)
B60W 10/18 (2012.01)
B60W 10/04 (2006.01)
B60W 30/02 (2012.01)
(Continued)

(52) U.S. Cl.
CPC ........... *G05D 1/0287* (2013.01); *B60W 10/04* (2013.01); *B60W 10/18* (2013.01); *B60W 10/20* (2013.01); *B60W 30/02* (2013.01); *G05D 1/0088* (2013.01); *G05D 1/0295* (2013.01); *G08G 1/22* (2013.01); *B60W 2050/008* (2013.01); *B60W 2400/00* (2013.01); *B60W 2555/20* (2020.02); *B60W 2754/10* (2020.02); *G05D 2201/0213* (2013.01)

(58) Field of Classification Search
CPC .......... G08G 1/22; G08G 1/20; G05D 1/0293; G05D 1/0295; G05D 1/0027; G05D 1/0291; G05D 1/0287; B60W 2556/65; B60W 2050/008; B60W 30/16; B60W 30/165
See application file for complete search history.

(56) References Cited

U.S. PATENT DOCUMENTS

2014/0005906 A1* 1/2014 Pandita ................. B60W 40/04
701/96
2015/0081189 A1* 3/2015 Fairgrieve ............. B60W 30/16
701/96
(Continued)

FOREIGN PATENT DOCUMENTS

JP 2008204094 A 9/2008
JP 2009-157794 A 7/2009
(Continued)

*Primary Examiner* — Kenneth J Malkowski
(74) *Attorney, Agent, or Firm* — Hunton Andrews Kurth LLP (57) ABSTRACT A vehicle platooning system to operate vehicles in a platoon in an appropriate order. The vehicle platooning system is applied to a vehicle that can be operated autonomously. A controller obtains information about each of the vehicles participating in the platoon including a straight line stability upon satisfaction of a condition to form a platoon with other vehicles, and assigns the vehicle having a relatively good straight line stability to a leader vehicle in the platoon.

4 Claims, 5 Drawing Sheets (51) Int. Cl.
 *B60W 10/20* (2006.01)
 *G08G 1/00* (2006.01)
 *B60W 50/00* (2006.01)

(56) References Cited

U.S. PATENT DOCUMENTS

| | | | |
|---|---|---|---|
| 2017/0293296 A1* | 10/2017 | Stenneth | G06Q 20/10 |
| 2017/0349176 A1* | 12/2017 | Alden | B60W 60/0023 |
| 2018/0158260 A1* | 6/2018 | Dudar | B62D 6/002 |
| 2020/0057447 A1* | 2/2020 | Kato | B60W 30/16 |
| 2020/0057453 A1* | 2/2020 | Laws | B60W 30/17 |

FOREIGN PATENT DOCUMENTS

| | | |
|---|---|---|
| JP | 2014153950 A | 8/2014 |
| JP | 2016-149044 A | 8/2016 |

\* cited by examiner

|  | Straight Line Stability | CD Value |
|---|---|---|
| Vehicle A | Good | Good |
| Vehicle B | Acceptable | Excellent |
| Vehicle C | Excellent | Acceptable |

VEHICLE PLATOONING SYSTEM

CROSS REFERENCE TO RELATED APPLICATIONS

The present disclosure claims the benefit of Japanese Patent Application No. 2017-230967 filed on Nov. 30, 2017 with the Japanese Patent Office, the disclosure of which are incorporated herein by reference in its entirety.

BACKGROUND

Field of the Disclosure

An embodiment of the present disclosure relates to the art of a vehicle platooning system for platooning a plurality of vehicles in a predetermined formation.

Discussion of the Related Art

JP-A-2009-157794 describes a rank travelling system configured to reduce energy consumption of vehicles travelling in a predetermined formation. The rank travelling system taught by JP-A-2009-157794 comprises: a self-vehicle information acquisition means for acquiring self-vehicle information; and a peripheral vehicle information acquisition means for acquiring information about other vehicles. According to the teachings of JP-A-2009-157794, the rank travelling system determines to operate the vehicles in a platoon and a formation of the platoon based on the information about the vehicle and the information about the vehicles travelling around the vehicle. The determination as to operate the vehicle in a platoon is made, for example, based on, a destination and a schedule of each vehicle, using a projected area of each vehicle a wind pressure applied to the vehicles.

JP-A-2016-149044 describes a platoon management device for saving fuel in a vehicle operated in a platoon. The platoon management device taught by JP-A-2016-149044 is configured to monitor the presence of a disturbance factor such as changes in a road configuration, a speed of a preceding vehicle etc. ahead of a leader vehicle. If an existence of the disturbance factor is found, the platoon management device increases each distance between the following vehicles.

According to the teachings of JP-A-2009-157794, the platoon is formed based on the projected area of each vehicle and the wind pressure applied to each vehicle so that energy consumption of each vehicle is reduced. However, if a vehicle easy to be affected by the disturbance is positioned as the leader vehicle in the platoon, the leader vehicle may swerve or sway when e.g., catching a crosswind or when running through a sharp corner. Consequently, the follower vehicle autonomously following the leader vehicle may also swerve or sway. That is, the leader vehicle may not trace a planned or optimum travel locus, and the follower vehicle may further deviate from the optimum travel locus. As a result, the formation of the platoon may not be maintained. In addition, fuel consumption and electric consumption would be increased thereby reducing energy efficiency.

As described, according to the teachings of JP-A-2016-149044, the distance between the vehicles is controlled taking account of the existence of the disturbance factor ahead of the leader vehicle. However, the distance between the vehicles is determined without taking account of the optimum travel locus. That is, the energy efficiency will not be improved by the teachings of JP-A-2016-149044.

SUMMARY

Aspects of embodiments of the present disclosure have been conceived noting the foregoing technical problems, and it is therefore an object of the present disclosure to provide a vehicle platooning system configured to operate vehicles in a platoon in an appropriate order.

The vehicle platooning system according to the embodiment of the present disclosure is applied to a vehicle having a prime mover, a brake device that applies braking torque to a wheel, and a steering system that turns the wheel. The vehicle platooning system comprises a controller that controls the prime mover, the brake device, and the steering system to operate the vehicle autonomously without requiring a manual operation, and that operates the vehicle to form a platoon with other vehicles while keeping a relative position of the vehicles in the platoon. Specifically, the controller is configured to: determine satisfaction of a condition to form a platoon with other vehicles; obtain information about each of the vehicles participating in the platoon including a straight line stability, if the condition to form the platoon with other vehicles is satisfied; and assign the vehicle having a relatively good straight line stability to a leader vehicle in the platoon.

In a non-limiting embodiment, the controller may be further configured to evaluate the straight line stability of the vehicles based on a deviation from a predetermined trace line measured in a predetermined condition. An evaluation of the straight line stability of the vehicle may become higher if the deviation from the trace line is small.

In a non-limiting embodiment, the information about each of the vehicles participating in the platoon may further include a planned route of each of the vehicles. The controller may be further configured to determine whether it is necessary to assign the vehicle having a relatively good straight line stability to the leader vehicle in the platoon, and assign the vehicle having a relatively good straight line stability to the leader vehicle in the platoon when it is necessary to assign the vehicle having a relatively good straight line stability to the leader vehicle in the platoon.

In a non-limiting embodiment, the controller may be further configured to: obtain information about external condition including weather information and geographical information on the planned route; determine whether it is necessary to assign the vehicle having a relatively good straight line stability to the leader vehicle in the platoon based on the external condition; assign the vehicle having a relatively good straight line stability to the leader vehicle in the platoon when it is necessary to assign the vehicle having a relatively good straight line stability to the leader vehicle in the platoon due to the external condition and; determine an order of the vehicles in the platoon based on an air resistance when it is not necessary to assign the vehicle having a relatively good straight line stability to the leader vehicle in the platoon.

In a non-limiting embodiment, the controller may be further configured to determine whether a plurality of vehicles have a relatively good straight line stability participate in the platoon, and assign the vehicle whose air resistance is lowest to the leader vehicle in the platoon, when it is necessary to assign the vehicle having a relatively good straight line stability to the leader vehicle, and a plurality of vehicles have a relatively good straight line stability participate in the platoon.

Thus, according to the embodiment of the present disclosure, the vehicle having a relatively good straight line stability is assigned to the leader vehicle in the platoon. According to the embodiment of the present disclosure, therefore, swerve of the leader vehicle can be reduced, in other words, stability of the leader vehicle in the platoon is increased. Consequently, stability of the follower vehicle can be increased to increase stability of the entire platoon. In addition, energy efficiency of each of the participant vehicle may also be improved.

In addition, according to the embodiment of the present disclosure, the vehicle having a relatively good straight line stability is assigned to the leader vehicle in accordance with a weather condition and a road condition of the planned route. Therefore, the leader vehicle will not serve significantly even if, for example, the leader vehicle receives strong wind. For this reason, the follower vehicle is allowed to follow the leader vehicle while tracing an optimum tracing line so that the platoon can be maintained even if the external condition is changed significantly.

Further, since the platoon can be maintained, running stability of each of the participant vehicles can be improved. Consequently, energy efficiency of each of the participant vehicles can be improved. In other words, fuel consumption or electric consumption of each of the participant vehicles can be improved.

Furthermore, if a plurality of vehicles have a relatively good straight line stability participate in the platoon, the vehicle whose air resistance is lowest is assigned to the leader vehicle. In this case, the platoon may also be maintained, and a running resistance of the platoon may be reduced. Therefore, energy efficiency of each of the participant vehicles may also be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
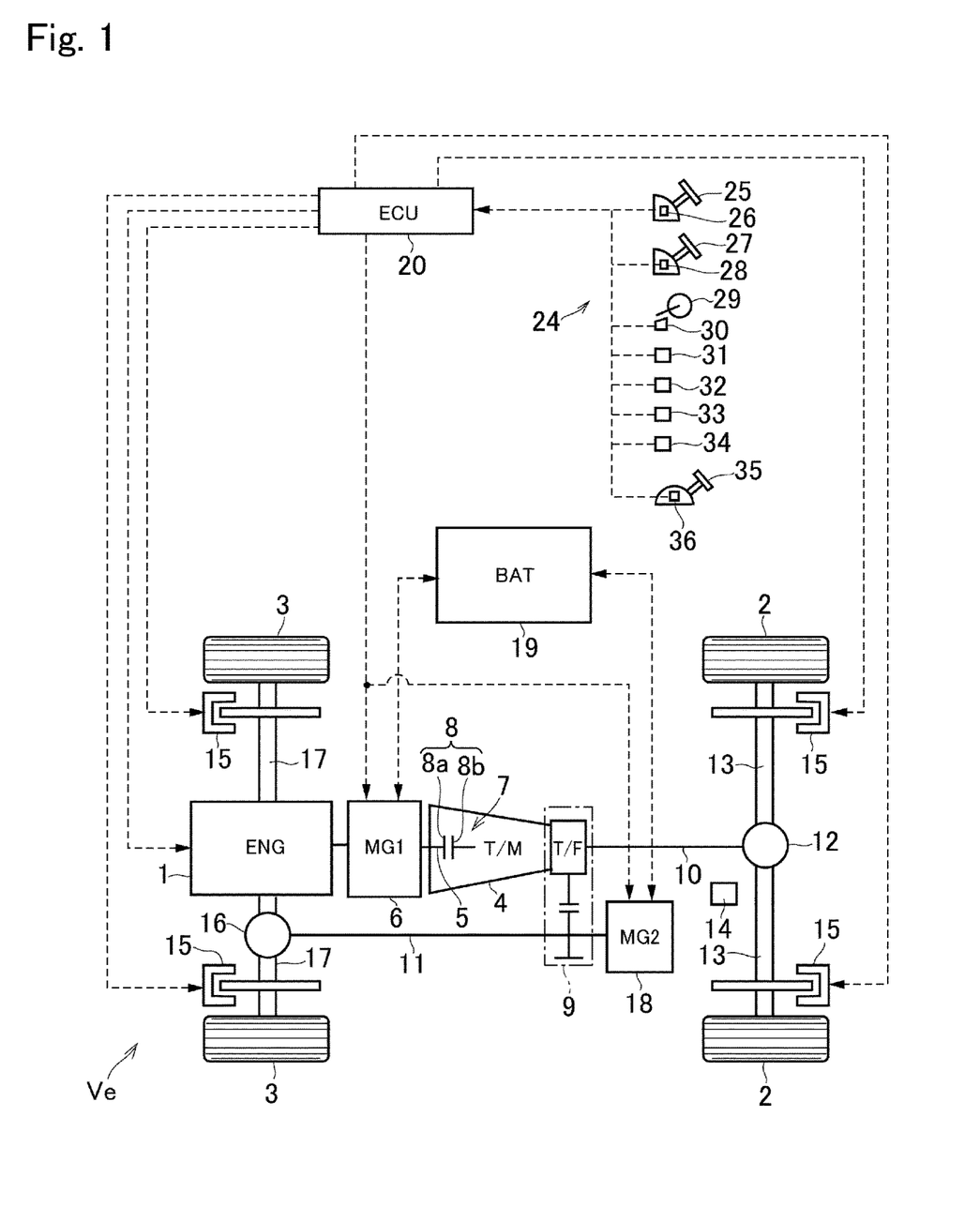
FIG. 1 is a schematic illustration showing an example of a structure of the vehicle to which the vehicle platooning system according to the embodiment is applied.

Embodiments of the present disclosure will now be explained with reference to the accompanying drawings. The vehicle platooning system according to at least one embodiment of the present disclosure may be applied to a vehicle having a relatively high stability such as a four-wheel drive layout vehicle, a front-engine rear-drive layout vehicle, a vehicle having a torque vectoring function, a vehicle having in-wheel motors, and so on. Turning now to FIG. 1, there is shown one example of a structure of a four-wheel drive layout (i.e., 4WD or AWD) vehicle Ve comprising an engine and two motors to which the vehicle platooning system is applied.

The vehicle Ve may be operated autonomously in such a manner as to follow a preceding vehicle while keeping a safe distance without operating an accelerator and a brake manually by a driver. To this end, the vehicle platooning system comprises an adaptive cruise control (to be abbreviated as the "ACC" hereinafter) system or a cooperative adaptive cruise control (to be abbreviated as the "CACC" hereinafter) system. Specifically, the ACC system is configured to operate the vehicle Ve autonomously while keeping a safe distance with other vehicles, and to stop the vehicle automatically when the preceding vehicle stops. On the other hand, the CACC system is configured to operate the vehicle Ve autonomously while keeping a relatively short distance with other vehicles in a platoon while communicating with the other vehicles through an inter-vehicle communication system. Such cruise control may be executed in response to a switching operation by the driver or passenger, or in response to a signal from a sensor.

Specifically, the vehicle Ve shown in FIG. 1 is an FR (i.e., front-engine rear-drive layout) based four-wheel drive vehicle. In the vehicle Ve, an engine 1 is arranged in a front section of the vehicle Ve between front wheels 3 (i.e., at about the width center of the vehicle). Nonetheless, the vehicle platooning system according to the embodiment of the present disclosure may also be applied to an FF (i.e., front-engine front-drive layout) based four-wheel drive vehicle.

For example, an internal combustion engine such as a gasoline engine and a diesel engine may be used as the engine 1. A transmission 4 is disposed on an output side of the engine 1, and the output shaft of the engine 1 is connected to an input shaft 5 of the transmission 4. An opening degree of an accelerator and a fuel injection in the engine 1 are controlled in accordance with a depression of an accelerator pedal to generate a required torque. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The transmission 4 is disposed downstream of a first motor (referred to as "MG1" in FIG. 1) 6 to transmit torque between the engine 1 or the first motor 6 and drive wheels. The transmission 4 is adapted to change a ratio of an input speed to an output speed arbitrarily. For example, a geared transmission in which a gear stage is shifted stepwise, and a continuously variable transmission in which a speed ratio is varied continuously may be used as the transmission 4. The transmission 4 is provided with a clutch 7 that is engaged to transmit torque, and that is disengaged to interrupt torque transmission thereby establishing a neutral stage.

The clutch 7 selectively transmits torque or interrupts torque transmission between the drive wheels and the engine 1 (and the first motor 6). In the embodiment illustrated in FIG. 1, the clutch 7 is arranged in the transmission 4. Specifically, the clutch 7 includes a friction plate 8 (or 8a)

connected to a rotary member (not shown) on the side of the engine 1, and a friction plate 8 (or 8b) connected to a rotary member (not shown) on the side of rear wheels 2. Although not elaborated in FIG. 1, a multi-plate clutch in which a plurality of the friction plates 8a and a plurality of the friction plates 8b are arranged alternately may be adopted as the clutch 7. Instead, the clutch 7 may also be disposed between the first motor 6 and the transmission 4 to serve as a starting clutch. In any of these cases, the engine 1 and the first motor 6 are disconnected from the powertrain of the vehicle Ve by disengaging the clutch 7, and connected to the powertrain by engaging the clutch 7.

Thus, the engine 1 and the transmission 4 are arranged coaxially, and the first motor 6 is disposed between the engine 1 and the transmission 4. The first motor 6 serves not only as a motor to generate torque when driven by electricity supplied thereto, but also as a generator to generate electricity when driven by torque of the engine 1. That is, the first motor 6 is a motor-generator. For example, a permanent magnet type synchronous motor, and an induction motor may be adopted as the first motor 6. The first motor 6 may be connected to the output shaft of the engine 1 or the input shaft 5 of the transmission 4 not only directly but also indirectly through a transmission device.

A transfer 9 is disposed on an output side of the transmission 4 to distribute output power of the engine 1 or output torque of the transmission 4 to front wheels 3 and the rear wheels 2. A rear propeller shaft 10 is connected to an output member (not shown) to deliver torque to the rear wheels 2, and a front propeller shaft 11 is connected to an output member (not shown) to deliver torque to the front wheels 3.

For example, a wrapping transmission using a chain or belt, a gear unit and so on may be used as the transfer 9. In addition, a full-time four-wheel drive mechanism including a differential mechanism that allows a differential rotation between the front wheels 3 and the rear wheels 2 and a restriction mechanism that restricts the differential rotation between the front wheels 3 and the rear wheels 2, and a part-time four-wheel drive mechanism that selectively interrupt torque transmission to the front wheels 3 may also be used as the transfer 9.

Specifically, the rear propeller shaft 10 extends from the transmission 4 or the transfer 9 to be connected to a rear differential gear unit 12 as a final reduction to distribute torque to the rear wheels 2 through drive shafts 13 extending laterally. On the other hand, the front propeller shaft 11 also extends from the transfer 9 to be connected to a front differential gear unit 16 as a final reduction to distribute torque to the front wheels 3 through drive shafts 17 extending laterally. The front wheels 3 are turned by a steering system 14 in accordance with a rotational angle of a steering 29. Optionally, the rear wheels 2 may also be turned by the steering system 14 according to need.

A second motor (referred to as "MG2" in FIG. 1) 18 is connected to the transfer 9 to drive the front propeller shaft 11. The second motor 18 is operated mainly as a motor to generate a drive torque to propel the vehicle Ve. In order to regenerate energy during deceleration, it is preferable to use a motor-generator such as a permanent magnet synchronous motor as the second motor 18.

The first motor 6 and the second motor 18 are electrically connected with an electric storage device (referred to as "BATT" in FIG. 1) 19 such as a battery and a capacitor. In the vehicle Ve, therefore, the first motor 6 and the second motor 18 may be operated individually as a motor by supplying electricity to those motors from the electric storage device 19, and electricity generated by the first motor 6 and the second motor 18 may be accumulated in the electric storage device 19. It is also possible to operate the second motor 18 as a motor by supplying electricity generated by the first motor 6 to the second motor 18 to propel the vehicle Ve by an output torque of the second motor 18.

The operating mode of the vehicle Ve may be selected form a plurality of modes by controlling the engine 1, the first motor 6, the second motor 18, and the clutch 7. For example, the operating mode of the vehicle Ve may be selected from: (1) an electric vehicle mode in which a drive force is generated by delivering torque generated by the second motor 18 to the drive wheels while stopping the engine 1; (2) a series hybrid vehicle mode in which the engine 1 is operated while disengaging the clutch 7, the first motor 6 is operated as a generator by a torque of the engine 1 to generate electricity, and a drive force is generated by delivering torque generated by the second motor 18 to the drive wheels; and (3) a parallel hybrid vehicle mode in which the engine 1 is operated while engaging the clutch 7, and a drive force is generated by delivering torques of the engine 1 and the second motor 18 to the drive wheels. Specifically, the operating mode of the vehicle Ve is selected with reference to a map for selecting the operating mode based on a required drive force and a vehicle speed. In addition, a drive mode of the vehicle Ve may be selected from a four-wheel drive mode and a two-wheel drive mode in accordance with a switching operation executed by a driver, or based on a friction coefficient of a road.

Figure 2:
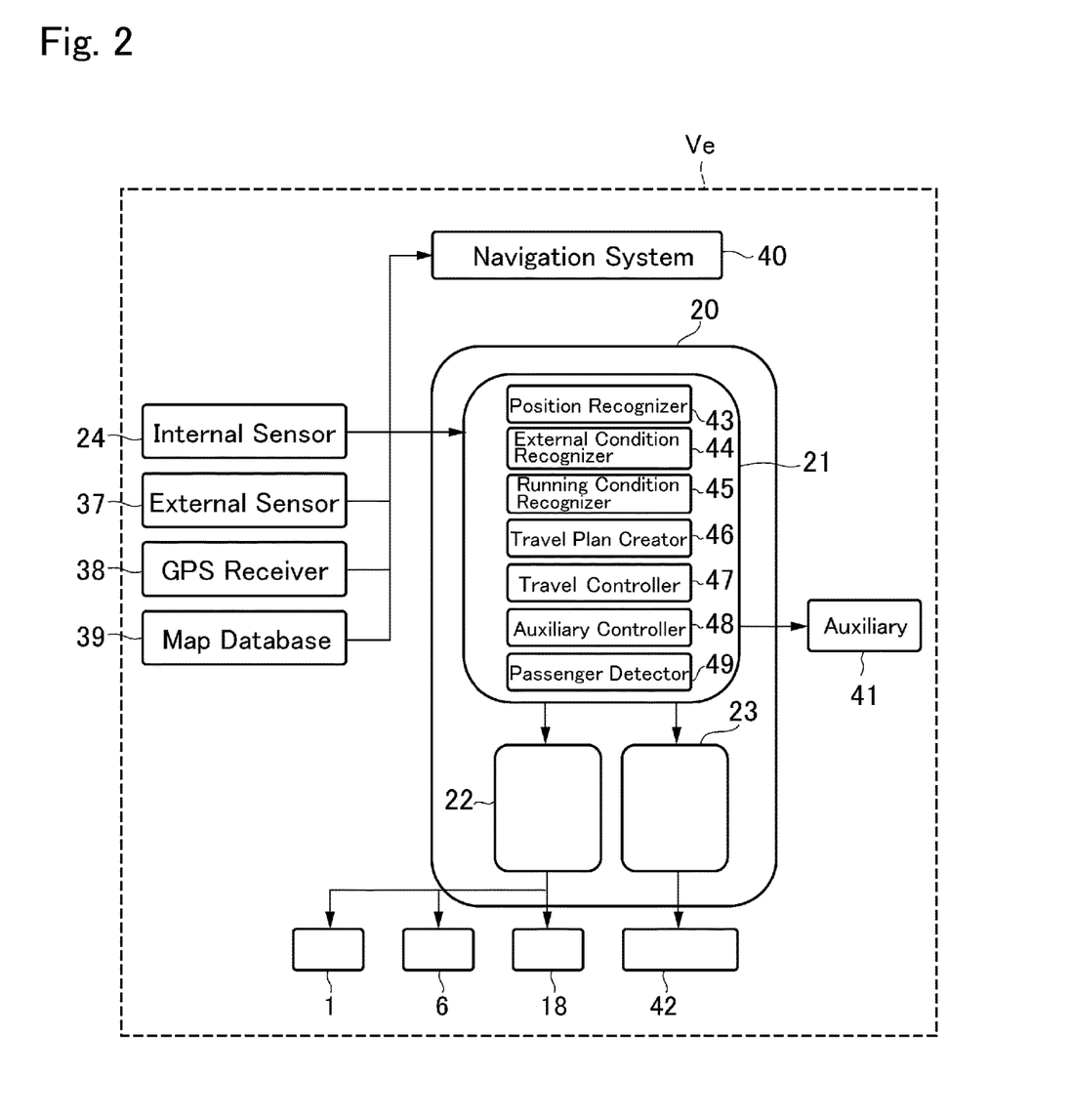
FIG. 2 is a schematic illustration showing a configuration of the vehicle platooning system.

The engine 1, the transmission 4, the clutch 7, the transfer 9, the first motor 6, and the second motor 18 are connected electrically to a controller 20 as an electronic control unit. The controller 20 is composed mainly of a microcomputer configured to execute a calculation based on an incident data and data stored in advance, and to transmit a calculation result in the form of command signal. A configuration of the controller 20 is shown in FIG. 2. The controller 20 comprises a main controller 21, a drive controller 22 and a sub-controller 23. Output signals from the main controller 21 are sent to the drive controller 22 and the sub-controller 23. Incident signals to the drive controller 22 are converted into drive commands and further transmitted to a throttle actuator of the engine 1, the first motor 6, and the second motor 18. Incident signals to the sub-controller 23 is converted into appropriate command signals and further transmitted to actuators of the clutch 7 and so on.

The main controller 21 is also composed mainly of a microcomputer. To the main controller 21, detection signals and information about operating conditions and behaviors of constituent elements of the vehicle Ve are transmitted from an internal sensor 24. Specifically, the internal sensor 24 includes an accelerator sensor 26 for detecting a position of an accelerator pedal 25, a brake sensor (or switch) 28 for detecting a depression of a brake pedal 27, a steering sensor 30 for detecting a steering angle of the steering wheel 29, a vehicle speed sensor 31 for detecting rotational speeds of the wheels 2 and 3, a longitudinal acceleration sensor 32 for detecting a longitudinal acceleration of the vehicle Ve, a lateral acceleration sensor 33 for detecting a lateral acceleration of the vehicle Ve, a yaw rate sensor 34 for detecting a yaw rate of the vehicle Ve, a shift sensor 36 for detecting a position of a shift lever (or switch) 35 and so on. The main controller 21 transmits command signals for controlling the engine 1, the first motor 6 and the second motor 18 to the drive controller 22, and transmits command signals for controlling the clutch 7 and so on to the sub-controller 23 based on incident signals from the internal sensor 24 as well as maps and formulas installed in advance. In FIG. 1, dashed-lines represent transmission of signals between the internal sensor 24 and the controller 20, and between the controller 20 to the engine 1, the first motor 6, the second motor 18, and a brake 15.

The vehicle platooning system according to the embodiments of the present disclosure is configured to operate the vehicle Ve autonomously. Specifically, the vehicle platooning system is configured to execute a starting operation, an accelerating operation, a steering operation, a braking operation, a stopping operation and etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver. An autonomous mode and a manual mode may be switched by the driver or passenger.

Thus, the vehicle Ve may be operated autonomously while manipulating the engine 1, the first motor 6, the second motor 18, the brake 15, the steering system 14 and so on by the controller 20.

In order to operate the vehicle Ve autonomously, detection signals from external sensors 37 for detecting external conditions are also sent to the main controller 21. For example, the external sensor 37 includes at least one of an on-board camera, a RADAR (i.e., a radio detection and ranging) a LIDAR (i.e., a laser imaging detection and ranging), an ultrasonic sensor, and an inter-vehicle communication system.

Specifically, the on-board camera is arranged inside of a windshield glass, and transmits recorded information about the external condition to the main controller 21. To this end, not only a monocular camera but also a stereo camera having a plurality of lenses and image sensors to achieve a binocular vision may be used as the on-board camera. If the stereo camera is used as the on-board camera, the main controller 21 is allowed to obtain three-dimensional information in the forward direction.

The RADAR is adapted to detect obstacles utilizing radio waves such as millimetric-waves and microwaves, and to transmit detected information to the main controller 21. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the main controller 21. Specifically, the LIDAR detects an obstacle such as other vehicles and so on by emitting laser light and analyzing the laser light reflected from the obstacle.

Information about other vehicles around the vehicle Ve such as destinations, positions, speeds, directions, operating modes etc. may be obtained through the inter-vehicle communication system to support safe driving. Such inter-vehicle communication is available among the vehicles individually having an on-board equipment for intelligent transport systems (ITS) even where infrastructure has not yet been improved.

In addition, the vehicle Ve is further provided with a GPS (i.e., global positioning system) receiver 38, a digital map database 39, and a navigation system 40. Specifically, the GPS receiver 38 is adapted to obtain a position (i.e., latitude and longitude) of the vehicle Ve based on incident signals from GPS satellites, and to transmit the positional information to the main controller 21. The map database 39 may be installed in the main controller 21, but map information stored in an external online information processing center may also be available. In the online information processing center, so-called bigdata including road information, traffic information, the map database and so on is stored, and such bigdata is updated continuously. Therefore, the vehicle Ve may acquire data through the inter vehicle communication between the vehicle Ve and other vehicle, through a road-vehicle communication between the vehicle Ve and an external communication device such as a signpost on or beside a road, and from the online information processing center. The navigation system 40 is configured to determine a travelling route of the vehicle Ve based on the positional information obtained by the GPS receiver 38 and the map database 39.

The main controller 21 carries out calculations based on the incident data or information from the internal sensor 24 and the external sensor 37 as well as the preinstalled data, and calculation results are sent in the form of command signal to the drive controller 22, the sub-controller 23 and auxiliaries 41. The incident signals to the drive controller 22 are converted into drive commands, and further transmitted to the engine 1 (including the throttle valve), the first motor 6, and the second motor 18. The incident signals to the sub-controller 23 are converted into appropriate command signals and further transmitted to actuators 42 of the brake 15, the steering system 14 and so on.

The actuator 42 includes a brake actuator, a steering actuator and so on. Specifically, the brake actuator is adapted to actuate the brake 15 to control braking force applied to the wheels 2 and in response to reception of the command signal from the sub-controller 23. The steering actuator is adapted to activate an assist motor of the steering system 14 to control a steering torque in response to reception of the command signal from the sub-controller 23.

The auxiliary 41 includes devices that are not involved in propulsion of the vehicle Ve such as a wiper, a headlight, a direction indicator, an air conditioner, an audio player and so on.

The main controller 21 comprises a position recognizer 43, an external condition recognizer 44, a running condition recognizer 45, a travel plan creator 46, a travel controller 47, an auxiliary controller 48, a passenger detector 49 and so on.

Specifically, the position recognizer 43 is configured to recognize a current position of the vehicle Ve on the map based on the positional information received by the GPS receiver 38 and the map database 39. The current position of the vehicle Ve may also be obtained from the positional information used in the navigation system 40. Optionally, the vehicle Ve may also be adapted to communicate with external sensors arranged along the road to obtain the current position of the vehicle Ve.

The external condition recognizer 44 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, a land form, weather information, a road configuration, a friction coefficient of road surface etc. may be obtained according to need.

The running condition recognizer 45 is configured to recognize running condition of the vehicle Ve such as a vehicle speed, a longitudinal acceleration, a lateral acceleration, a yaw rate and so on based on detection result of the internal sensors 24.

The travel plan creator 46 is configured to create a travel locus of the vehicle Ve based on a target course determined by the navigation system 40, a position of the vehicle Ve recognized by the position recognizer 13, and an external condition recognized by the external condition recognizer 44. That is, the travel plan creator 46 creates a travel locus of the vehicle Ve within the target course in such a manner that the vehicle Ve is allowed to travel safely and properly while complying traffic rules.

In addition, the travel plan creator 46 is further configured to create a travel plan in line with the created travel locus. Specifically, the travel plan creator 46 creates the travel plan in line with the target course based on the external conditions recognized by the external condition recognizer 44 and the map database 39.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 46 creates a future plan to change a vehicle speed, acceleration, steering torque etc. during travelling along the target course in the form of e.g., a map.

Alternatively, the travel plan creator 46 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

As described, the controller 20 is configured to work with the adaptive cruise control system or cooperative adaptive cruise control system, and the travel plan may also be created in such a manner as to follow the preceding vehicle while communicating with the other vehicles. The adaptive cruise control system may be manipulated by switches arranged in the vicinity of the steering wheel or within a steering pad. Specifically, activation of the cruise control system, selection of a control mode, setting a target distance from a preceding vehicle etc. may be executed by manipulating the switches. For example, the target distance may be selected from a long distance, a middle distance, and a short distance.

The travel controller 47 is configured to operate the vehicle Ve autonomously in line with the travel plan created by the travel plan creator 46. To this end, specifically, the travel controller 47 transmits command signals to the actuators 42, the engine 1, the first motor 6, and the second motor 18 through the drive controller 22 and the sub-controller 23.

The auxiliary controller 48 is configured to autonomously operate the auxiliaries 41 such as the wiper, the headlight, the direction indicator, the air conditioner, the audio player and so on in line with the travel plan created by the travel plan creator 46.

The passenger detector 49 is configured to determine the existence of passenger in the vehicle Ve and the preceding vehicle. For example, the passenger detector 49 determines the existence of passenger in the vehicle Ve based on a fact that a power switch, an ignition switch, or a start button is turned on, that a passenger sitting on a vehicle seat is detected, that a seat belt is fastened, or that the steering wheel is turned. Instead, a presence of the passenger may be determined based on a signal from a biometric passenger sensor such as an infrared sensor for detecting a body temperature of the passenger, and a motion sensor such as a Doppler sensor for detecting a body movement of the passenger. Meanwhile, the passenger detector 49 determines the existence of passenger in the preceding vehicle by obtaining information about the preceding vehicle through the inter-vehicle communication, or by analyzing information obtained by the on-board camera.

Thus, the vehicle Ve shown in FIG. 1 may be operated autonomously. During autonomous operation, the vehicle Ve may travel in a platoon while exchanging information about a position, a speed etc. with a preceding and a follower vehicle through the inter-vehicle communication or the like. In the platoon, a plurality of vehicles including the vehicle Ve travels in a predetermined formation or order while keeping relative positions. However, if a vehicle easy to be affected by the disturbance such as wind, irregularity of road etc. is positioned as the leader vehicle in the platoon, the leader vehicle may swerve or sway when e.g., catching a crosswind or when running on an irregular road. Consequently, the follower vehicle following the leader vehicle may also swerve or sway. That is, the leader vehicle may not trace a planned or optimum travel locus, and the follower vehicle may further deviate from the optimum travel locus. As a result, the formation of the platoon may not be maintained. In order to maintain the formation of the platoon irrespective of weather condition or road condition, the controller 20 of the vehicle platooning system executes a routine shown in FIG. 3.

Figure 3:
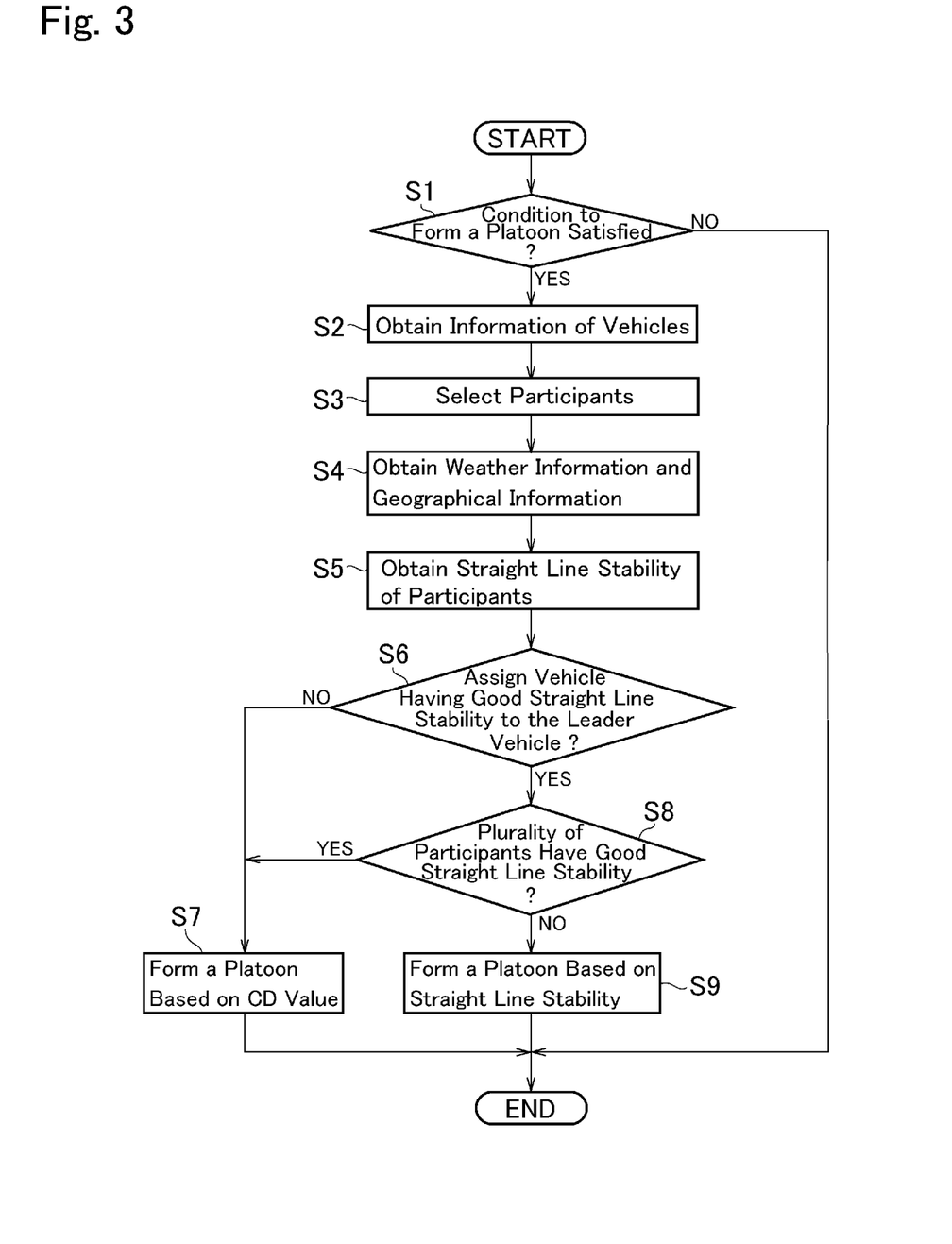
FIG. 3 is a flowchart showing an example of routine executed by the vehicle platooning system.

Specifically, the routine shown in FIG. 3 is executed to control an order of the vehicles participating in the platoon, and vehicles which can be operated autonomously may participate in the platoon.

At step S1, it is determined whether a condition to form a platoon with other vehicles is satisfied by communicating with other vehicles through the inter-vehicle communication system or the like. For example, the condition to form a platoon is satisfied if there are other vehicles that can be operated autonomously and that can communicate with the vehicle Ve through the inter-vehicle communication system or the like around the vehicle Ve when the vehicle Ve enters a highway or freeway. If the platoon has already been formed by the other vehicles in e.g., the highway when the vehicle Ve enters the highway, and if the determination at step S1 is satisfied, the vehicle Ve may participate in the platoon. In this case, if a plurality of platoons travels on the highway, the vehicle Ve may select a platoon to participate in taking account of a destination and a running condition.

If the condition to form a platoon with other vehicles is not satisfied so that the answer of step S1 is NO, the routine returns. By contrast, if the condition to form a platoon with other vehicles is satisfied so that the answer of step S1 is YES, the routine progresses to step S2 to obtain information about the other vehicles and the vehicle Ve. At step S2, specifically, a size, a fuel level, a state of charge level of the battery, a distance to a destination, a planned route of each of the other vehicles and the vehicle Ve are obtained respectively. At step S2, a fuel consumption or an electric consumption of each of the other vehicles and the vehicle Ve given that the other vehicles and the vehicle Ve travel individually to the destinations without participating in the platoon is also calculated respectively. In addition, an air resistance (i.e., a drag coefficient) and a front projected area of each of the other vehicles and the vehicle Ve are calculated respectively. Further, information about activation of an air conditioner and information about a schedule for a rest in each of the other vehicles and the vehicle Ve are also obtained. For example, if the other vehicle has already formed a platoon, the above-mentioned information is obtained from the other vehicles participating in the platoon and the vehicle Ve.

Then, at step S3, participants to form a platoon with the vehicle Ve are selected based on the information obtained at step S2. In other words, the vehicles suitable to form a platoon together with the vehicle Ve are selected based e.g., on the destination.

After selecting the participants, weather information and geographical information on the planned route are obtained at step S4. External condition such as weather, a ground form, a road configuration etc. change a lot during travel, and the platoon may not be maintained if the external condition changes significantly. For this reason, it is preferable to form a platoon in a formation suitable for the external condition. Thus, the weather information and the geographical information are uses as parameters to determine a formation of the platoon.

As the geographical information, specifically, an existence of a curve or a slope which may disturb the platoon on the planned route is detected. As described, if the vehicle easy to be affected by the disturbance is assigned as the leader vehicle in the platoon, the leader vehicle may swerve or sway and deviate from the optimum travel locus (or a trace line) when passing through the curve or slope. Consequently, the follower vehicle may also swerve or sway and further deviate from the optimum travel locus to drift from a lane. That is, the platoon may not be maintained. At step S4, therefore, an existence of such geographical irregularity ahead of the platoon is detected.

As the weather information, information about rain and wind which may disturb the platoon on the planned route is obtained. In other words, a rainfall forecast and a wind forecast on the planned route ahead of the platoon are checked. As described in JP-A-2009-157794, if a vehicle propels against the wind blowing from diagonally in front of the vehicle, an energy consumption may be reduced by propelling the vehicle in a direction opposite to a blowing direction of the wind, that is, by propelling the vehicle in the diagonally forward direction against the wind. However, if the vehicle easy to be affected by the disturbance is assigned as the leader vehicle in the platoon, the leader vehicle may swerve or sway and deviate from the optimum travel locus when passing through a rainy site or windy site. Consequently, the follower vehicle may also swerve or sway and further deviate from the optimum travel locus to drift from a lane. That is, the platoon may not be maintained. At step S4, therefore, such weather information ahead of the platoon is obtained from the information processing center or the data center storing updated bigdata.

Figure 4:
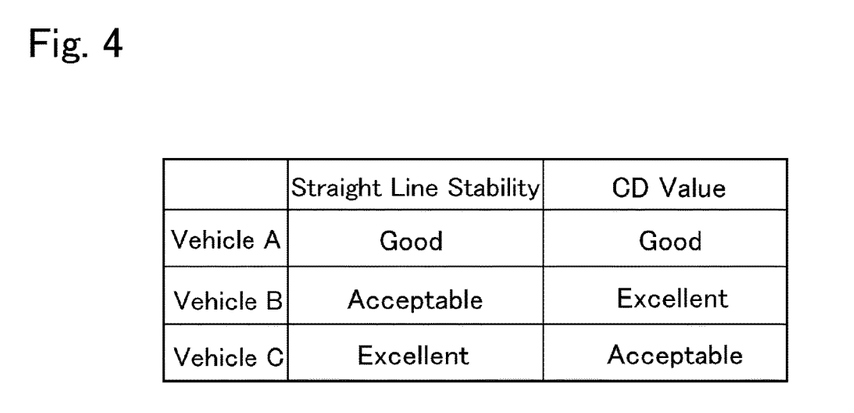
FIG. 4 is a table showing a stability of straight line stability and drag coefficient of each vehicle shown in FIG. 3.

Then, at step S5, straight line stability of each of the participant vehicles is obtained. The straight line stability of the vehicle is used as a parameter to determine a formation or order of the participant vehicle in a platoon in accordance with the detected road configuration and whether information. An example of evaluation of the straight line stability of the participant vehicles is shown in FIG. 4. As can be seen from the table shown in FIG. 4, the straight line stability and the drag coefficient (indicated as CD value in FIG. 4) are graded into excellent, good, and acceptable. As described, the drag coefficient of the participant vehicles have already been obtained at step S2, and an evaluation of the drag coefficient becomes higher if it is small.

The straight line stability of the vehicle is evaluated based on a result of a test for determining whether the vehicle is capable of tracing an optimum trace line. Such test is conducted in a predetermined weather condition (precipitation, wind etc.) and a road condition (road condition, land feature etc.), and the vehicle receives a high evaluation of the straight line stability if a deviation from the trace line is small. For example, if a deviation from the trace line is smaller than a threshold value $\alpha$, an evaluation of the straight line stability will be "good", and if a deviation from the trace line is smaller than another threshold value ß that is smaller than the threshold value $\alpha$ ($\alpha$>ß), an evaluation of the straight line stability will be "excellent". In the case of example shown in FIG. 4, a deviation of the vehicle C is smaller than the threshold value ß and hence the evaluation score of the vehicle C is "excellent", and a deviation of the vehicle A is smaller than the threshold value $\alpha$ and hence the evaluation score of the vehicle A is "good". For example, the evaluation of the straight line stability may also be determined taking account of an existence of a passenger and a loading weight, and the evaluations of the vehicles may be stored in the information processing center or the data center.

Such determination at step S5 may also be executed simultaneously with step S4 or prior to step S4. For example, the straight line stabilities of the four-wheel drive layout vehicle Ve shown in FIG. 1, a front-engine rear-drive layout vehicle, a vehicle having a torque vectoring function, a vehicle having in-wheel motors are relatively high.

Thereafter, it is determined at step S6 whether it is necessary to assign the vehicle having a relatively good or excellent straight line stability to the leader vehicle based on the weather information and the geographical information of the planned route obtained at steps S4. In other words, it is determined at step S6 whether the platoon cannot be maintained due to the expected weather and road condition if the vehicle whose straight line stability is less than those of the other vehicles is assigned to the leader vehicle.

If it is not necessary to assign the vehicle having a good or excellent straight line stability to the leader vehicle taking account of the weather condition and the road condition so that the answer of step S6 is NO, the routine progresses to step S7 to form a platoon based on a drag coefficient or an air resistance. Normally, fuel consumption and electric consumption can be reduced if the air resistance is small. In this case, therefore, the vehicle whose drag coefficient or air resistance is lowest is assigned to the leader vehicle of the platoon. For example, in the case of example shown in FIG. 4, the vehicle B is assigned to the leader vehicle, the vehicle A is assigned to the first follower vehicle, and the vehicle C is assigned to the second follower vehicle.

Otherwise, if it is necessary to assign the vehicle having a good or excellent straight line stability to the leader vehicle taking account of the weather condition and the road condition so that the answer of step S6 is YES, the routine progresses to step S8 to determine whether a plurality of vehicles have a good or excellent straight line stability in the participants. If a plurality of vehicles having a good or excellent straight line stability participate in the platoon, it is preferable to form the platoon in such a manner as to reduce an air resistance of the platoon. In a case that a plurality of vehicles have a good or excellent straight line stability participate in the platoon so that the answer of step S8 is YES, the routine also progresses to step S7 to form a platoon by assigning the vehicle whose drag coefficient is lowest. For example, in the case of example shown in FIG. 4, although the straight line stability of the vehicle A is "good" and the straight line stability of the vehicle C is "excellent", the CD value of the vehicle A is "excellent" and the CD value of the vehicle C is "acceptable". In this case, therefore, the vehicle A is assigned to the leader vehicle, the vehicle C is assigned to the first follower vehicle, and the vehicle B is assigned to the second follower vehicle. In this case, the vehicle B may also be assigned to the first follower vehicle, and the vehicle C may also be assigned to the second follower vehicle taking account of the expected weather and road conditions.

By contrast, if a plurality of vehicles have a good or excellent straight line stability do not participate in the platoon so that the answer of step S8 is NO, the routine also progresses to step S9 to form a platoon based on the straight line stability. In this case, the vehicle having a good or excellent straight line stability is assigned to the leader vehicle, and an order of the follower vehicle is determined arbitrarily taking account of the expected weather and road conditions.

Thus, according to the embodiment of the present disclosure, an order or a formation of the platoon is determined based on the straight line stability and the external condition. According to the embodiment of the present disclosure, therefore, the platoon may be maintained irrespective of the external condition. According to the embodiment of the present disclosure, specifically, the participants to form a platoon with the vehicle Ve are selected based on the information about a destination and so on, and the order of the participants in the platoon is determined taking account of the expected weather and road conditions. If it is necessary to assign the vehicle having an excellent straight line stability to the leader vehicle, the platoon is formed by assigning the vehicle having an excellent straight line stability to the leader vehicle.

Figure 5A:
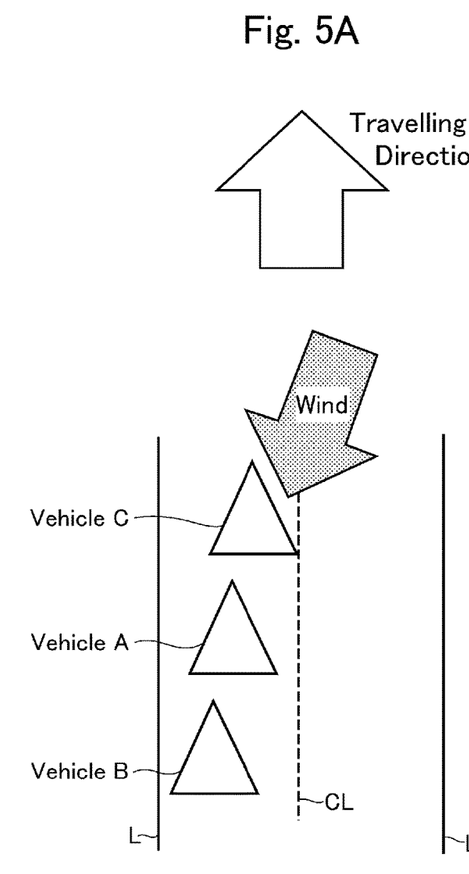
FIG. 5A is a schematic illustration showing a situation in which the platoon can be maintained.
Figure 5B:
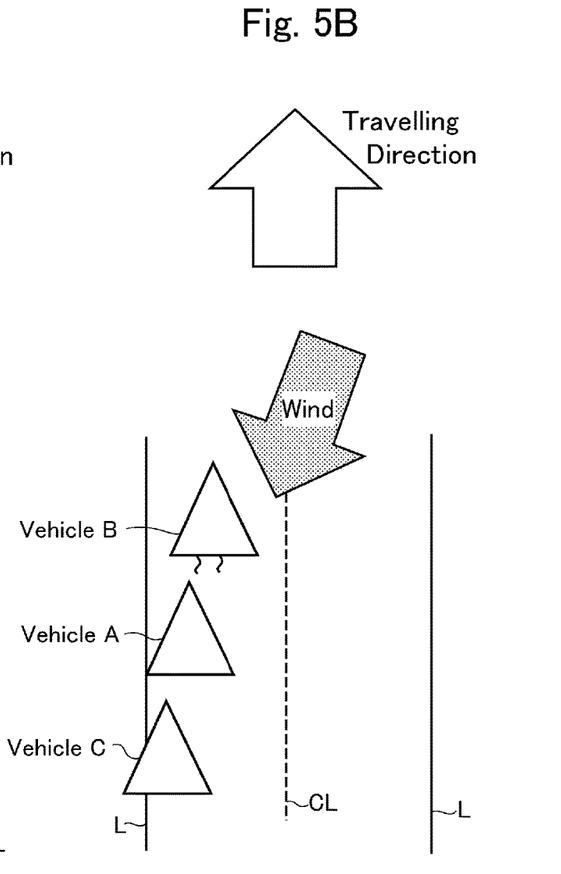
FIG. 5B is a schematic illustration showing a situation in which the platoon cannot be maintained.

FIG. 5A shows an example of the platoon formed by executing the routine shown in FIG. 3, and FIG. 5B an example of the platoon formed without executing the routine shown in FIG. 3. In FIGS. 5A and 5B, "L" represents a side-line, and "CL" represents a center line. As can be seen from FIG. 5B, when the leader vehicle B in the platoon formed without executing the routine shown in FIG. 3 catches the wind blowing from diagonally forward right, the leader vehicle B swerves to the left side in FIG. 5B. In other words, the leader vehicle B may not trace the optimum trace line due to wind. In this situation, the first follower vehicle A and the second follower vehicle C are not allowed to follow the leader vehicle B while tracing the optimum trace line. Consequently, the first follower vehicle A swerves to the left side-line, and the second follower vehicle C strays outside of the left side-line. Thus, the platoon cannot be maintained.

On the other hand, in the platoon shown in FIG. 5A, the vehicle C having an excellent straight line stability is assigned to the leader vehicle. In this case, all of the vehicles are allowed to trace the optimum trace line within a lane even in the above-mentioned condition, that is, even when running against the wind of same velocity as the example shown in FIG. 5B. That is, since a deviation of the leader vehicle C from the optimum trace line is small, the follower vehicles A and B are allowed to trace the optimum trace line while maintaining the formation of the platoon.

That is, even if the vehicle having a good straight line stability is not assigned to the leader vehicle, the leader vehicle can be switched to the vehicle having a good straight line stability to maintain the platoon depending on the external condition. Therefore, all the vehicles in the platoon are allowed to travel in the platoon without being disturbed by an external disturbance so as to reduce the fuel consumption and the electric consumption.

If a plurality of vehicles having a good or excellent straight line stability participate in the platoon, the vehicle whose air resistance is smallest in the participants is assigned to the leader vehicle. Therefore, an air resistance of the entire platoon can be reduced so that the energy consumption of each of the participant vehicles is reduced.

Figure 6:
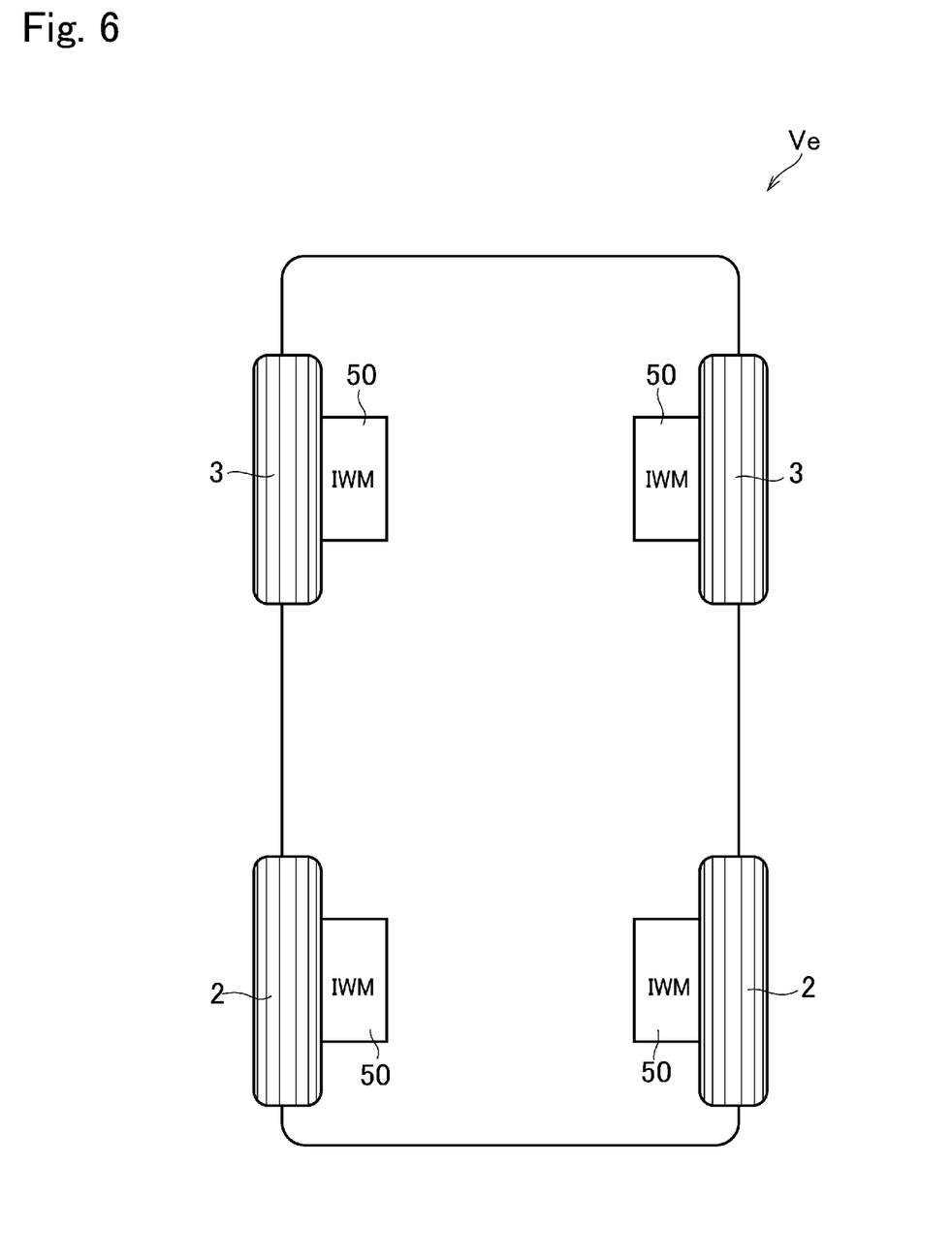
FIG. 6 is a schematic illustration showing another example of a structure of the vehicle to which the vehicle platooning system is applied.

Although the above exemplary embodiments of the present disclosure have been described, it will be understood by those skilled in the art that the present disclosure should not be limited to the described exemplary embodiments, and various changes and modifications can be made within the scope of the present disclosure. For example, the vehicle platooning system according to the embodiment of the present disclosure may also be applied to a vehicle Ve shown in FIG. 6 having in-wheel motors. As illustrated in FIG. 6, in the vehicle Ve, each of the front wheels 3 and the rear wheels 2 is individually provided with an in-wheel motor (referred to as "IWM" in FIG. 6) 50. Specifically, each of the in-wheel motor 50 is installed in a rim of the front wheel 3 or the rear wheel 2 below a suspension spring. In the vehicle Ve shown in FIG. 6, therefore, a drive torque and a brake torque of each of the front wheels 3 and the rear wheels 2 may be controlled individually. Here, the in-wheel motor 50 may be arranged only in the front wheels 3 or the rear wheels 2.

The order of the participant vehicles in the platoon may be changed arbitrarily depending on a change in the external conditions such as the weather condition etc. during propulsion in the platoon to the destination.

What is claimed is:

1. A vehicle platooning system for a vehicle having a prime mover, a brake device that applies braking torque to a wheel, and a steering system that turns the wheel, comprising:
   a controller that controls the prime mover, the brake device, and the steering system to operate the vehicle autonomously without requiring a manual operation, and that operates the vehicle to form a platoon with other vehicles while keeping a relative position of the vehicles in the platoon,
   wherein the controller is configured to
   determine satisfaction of a condition to form a platoon with other vehicles,
   obtain information about each of the vehicles participating in the platoon including a straight line stability, upon satisfaction of the condition to form the platoon with other vehicles, and
   wherein the information about each of the vehicles participating in the platoon further includes a planned route of each of the vehicles, and
   the controller is further configured to
   determine whether it is necessary to assign the vehicle having a relatively good straight line stability in which a deviation of the vehicle from a predetermined base line is smaller than a threshold value to a leader vehicle in the platoon if the platoon is formed based on the planned route, and
   assign the vehicle having the relatively good straight line stability to the leader vehicle in the platoon when it is necessary to assign the vehicle having the relatively good straight line stability to the leader vehicle in the platoon.

2. The vehicle platooning system for the vehicle as claimed in claim 1, wherein the controller is further configured to
   obtain information about external condition including weather information and geographical information on the planned route, determine whether it is necessary to assign the vehicle having the relatively good straight line stability to the leader vehicle in the platoon based on the external condition, assign the vehicle having the relatively good straight line stability to the leader vehicle in the platoon when it is necessary to assign the vehicle having the relatively good straight line stability to the leader vehicle in the platoon due to the external condition, and determine an order of the vehicles in the platoon based on an air resistance when it is not necessary to assign the vehicle having the relatively good straight line stability to the leader vehicle in the platoon.

3. The control system for the vehicle as claimed in claim 1, wherein the controller is further configured to determine whether a plurality of vehicles have the relatively good straight line stability participate in the platoon, and assign the vehicle whose air resistance is lowest to the leader vehicle in the platoon, when it is necessary to assign the vehicle having the relatively good straight line stability to the leader vehicle, and a plurality of vehicles having the relatively good straight line stability participate in the platoon.

4. The control system for the vehicle as claimed in claim 2, wherein the controller is further configured to determine whether a plurality of vehicles having the relatively good straight line stability participate in the platoon, and assign the vehicle whose air resistance is lowest to the leader vehicle in the platoon, when it is necessary to assign the vehicle having the relatively good straight line stability to the leader vehicle, and a plurality of vehicles having the relatively good straight line stability participate in the platoon.

\* \* \* \* \*